(12) United States Patent
Zou et al.

(10) Patent No.: US 11,086,740 B2
(45) Date of Patent: Aug. 10, 2021

(54) MAINTAINING STORAGE ARRAY ONLINE

(71) Applicant: INTERNATIONAL BUSINESS MACHINES CORPORATION, Armonk, NY (US)

(72) Inventors: Bo Zou, Shanghai (CN); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/156,234

(22) Filed: Oct. 10, 2018

(65) Prior Publication Data
US 2020/0117556 A1  Apr. 16, 2020

(51) Int. Cl.
*G06F 11/20* (2006.01)
*G06F 3/06* (2006.01)

(52) U.S. Cl.
CPC ........ *G06F 11/2094* (2013.01); *G06F 3/0617* (2013.01); *G06F 3/0659* (2013.01); *G06F 3/0683* (2013.01); *G06F 2201/805* (2013.01); *G06F 2201/82* (2013.01)

(58) Field of Classification Search
CPC ............. G06F 11/2064; G06F 11/2094; G06F 11/2056; G06F 11/1092; G06F 11/1088; G06F 3/0617; G06F 3/0659; G06F 3/0683; G06F 2201/805; G06F 2201/82
See application file for complete search history.

(56) References Cited

U.S. PATENT DOCUMENTS

| | | | |
|---|---|---|---|
| 6,880,101 B2 | 4/2005 | Golasky et al. | |
| 7,840,838 B2 | 11/2010 | Stewart | |
| 8,289,641 B1 * | 10/2012 | Emami | G11B 27/36 360/31 |
| 9,378,092 B2 | 6/2016 | Cho et al. | |
| 9,990,256 B1 * | 6/2018 | Natanzon | G06F 11/1448 |
| 2005/0210322 A1 * | 9/2005 | Corrado | G06F 3/064 714/13 |
| 2013/0086324 A1 * | 4/2013 | Soundararajan | G06F 12/0811 711/122 |

(Continued)

OTHER PUBLICATIONS

IBM Technical Disclosure Bulletin, Sep. 1990, NN900914 (Year: 1990).*

(Continued)

*Primary Examiner* — Matthew M Kim
*Assistant Examiner* — Kurosu Risa Altaf
(74) *Attorney, Agent, or Firm* — L. Jeffrey Kelly

(57) ABSTRACT

Embodiments of the present disclosure relate to a method, system and computer program product for maintaining a storage array online. According to the method, an unrecoverable error is detected by one or more processors as having occurred in a failed disk of a storage array in first storage. The failed disk is replaced with a spare disk in the first storage. Data is retrieved from a second storage for storing into a stripe of the first storage based on address information of a data block of the failed disk. The second storage stores mirrored data of data stored in the first storage. The stripe includes data blocks distributed across all disks in the storage array of the first storage. The retrieved data is caused to be written into the stripe of the storage array of the first storage. In other embodiments, a system and a computer program product are disclosed.

20 Claims, 10 Drawing Sheets

(56) References Cited

U.S. PATENT DOCUMENTS

| | | | | |
|---|---|---|---|---|
| 2013/0304775 A1* | 11/2013 | Davis | ................. | H04L 67/1097 |
| | | | | 707/827 |
| 2014/0215262 A1* | 7/2014 | Li | ....................... | G06F 11/1092 |
| | | | | 714/6.21 |
| 2014/0281690 A1* | 9/2014 | Hsu-Hung | .......... | G06F 11/1469 |
| | | | | 714/6.23 |
| 2016/0292025 A1* | 10/2016 | Gupta | ................... | G06F 11/008 |
| 2017/0315753 A1* | 11/2017 | Blount | .................. | G06F 3/0649 |
| 2020/0042388 A1* | 2/2020 | Roberts | ............... | G06F 11/1092 |
| 2020/0042390 A1* | 2/2020 | Roberts | ............... | G06F 11/1464 |

OTHER PUBLICATIONS

Mell et al., "The NIST Definition of Cloud Computing", National Institute of Standards and Technology, Special Publication 800-145, Sep. 2011, pp. 1-7.

\* cited by examiner

MAINTAINING STORAGE ARRAY ONLINE

BACKGROUND

The present disclosure relates to data storage, and more specifically, to a method and system for maintaining a storage array online.

An important factor for computer data storage systems may include reliably maintaining data stored in a disk drive in case of a particular memory failure or error. One available technique for increasing disk reliability relies upon redundant data storage on disks such as Redundant Array of Inexpensive Disks (RAID) systems. RAID systems are currently used in many computer systems that demand improved reliability for data storage while utilizing lower cost memory disks.

A high performance storage system may avoid data loss and ensure data security, however, disk failure in the operation of a storage system may be anticipated. Data may be lost when one or more disks fail, making it impossible to recover data from the storage device. If data is lost, the storage array may be set to an offline state for repairing.

SUMMARY

In a first aspect, embodiments of the present disclosure provide a method. According to the method, an unrecoverable error is detected by one or more processors as having occurred in a failed disk of a storage array in first storage. The failed disk is replaced by one or more processors with a spare disk in the first storage. Data is retrieved by one or more processors from a second storage for storing into a stripe of the first storage based on address information of a data block of the failed disk. The second storage stores mirrored data of the data stored in the first storage. The stripe includes data blocks distributed across all disks in the storage array of the first storage. The retrieved data is caused by one or more processors to be written into the stripe of the storage array of the first storage.

In a second aspect, embodiments of the present disclosure provide a system. The system includes a processing unit; and a memory coupled to the processing unit and storing instructions thereon. The instructions, when executed by the processing unit, perform the method according to the above first aspect.

In a third aspect, embodiments of the present disclosure provide a computer program product. The computer program product is tangibly stored on non-transient machine-readable medium and includes machine-executable instructions. The machine-executable instructions, when executed on a device, cause the device to perform the method according to the above first aspect.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
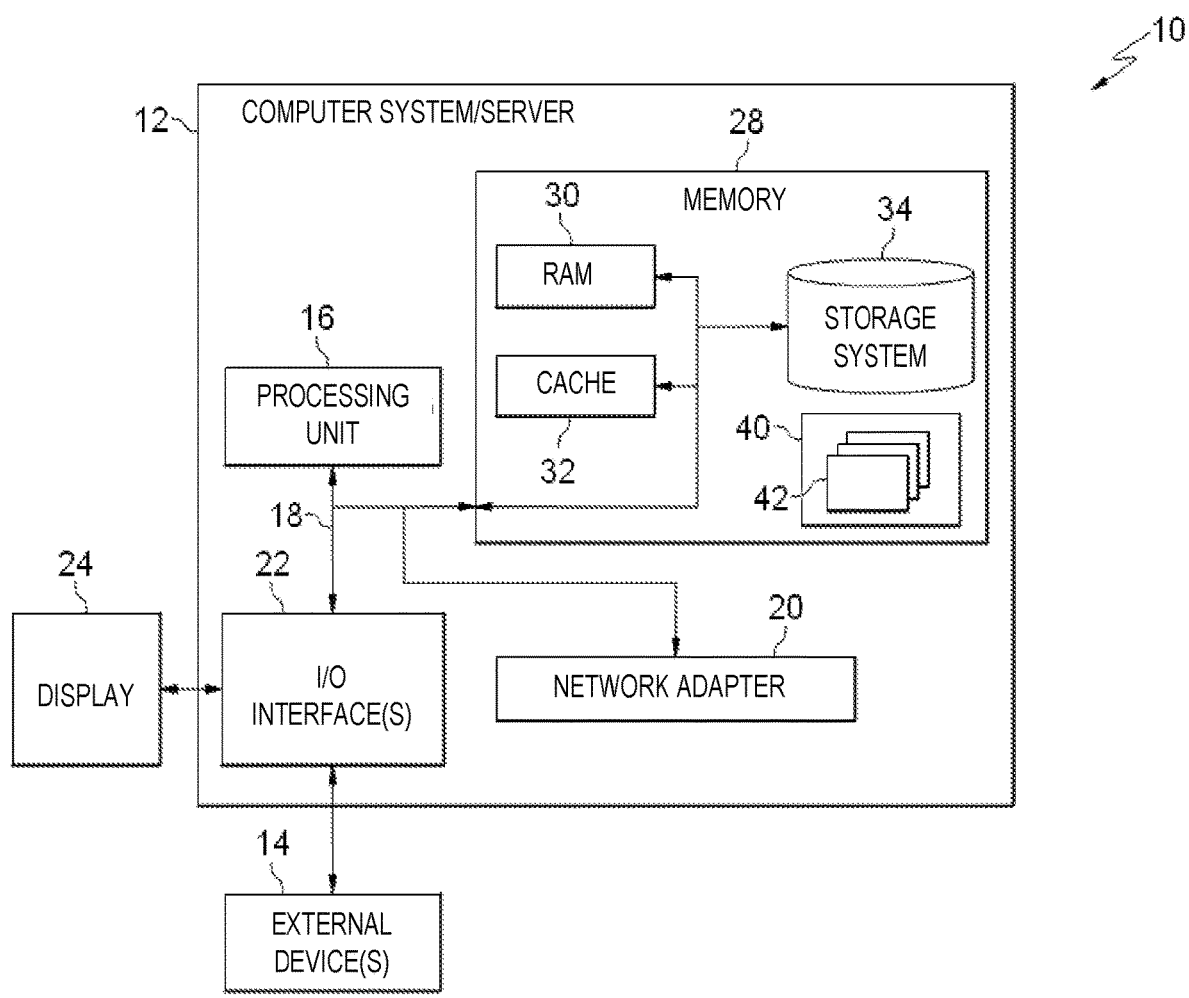
FIG. 1 illustrates a cloud computing node according to an embodiment of the present disclosure.

Some embodiments will be described in more detail with reference to the accompanying drawings, in which the embodiments of the present disclosure have been illustrated. The present disclosure may be implemented in various manners and should not be construed to be limited to the embodiments disclosed herein. Embodiments are provided for the understanding of the present disclosure and convey the scope of the present disclosure to those skilled in the art.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. The cloud computing node 10 is only one example of a suitable cloud computing node and is not intended to suggest any limitation as to the scope of use or functionality of embodiments of the invention described herein. The cloud computing node 10 is capable of being implemented in and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

The computer system/server 12 may be described in the general context of computer system-executable instructions, such as program modules being executed by a computer system. Program modules may include, for example, routines, programs, objects, components, logic and data structures that may perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 in cloud computing node 10 is shown in the form of a general-purpose computing device. Components of the computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 may include computer system readable media in the form of volatile memory, such as random access memory (RAM) 30 and/or cache memory 32. The computer system/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to the bus 18 by one or more data media interfaces. As will be further depicted and described below, the memory 28 may include at least one program product having a set (e.g., at least one set) of program modules that are configured to carry out the functions of embodiments of the invention.

The program/utility 40, having a set (e.g., at least one set) of the program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device or a display 24; one or more devices that enable a user to interact with computer system/server 12; and/or any devices (e.g., a network card or a modem) that enable the computer system/server 12 to communicate with one or more other computing devices. Such communication can occur via Input/Output (I/O) interfaces 22. The computer system/server 12 may communicate with one or more networks such as a local area network (LAN), a general wide area network (WAN), and/or a public network (e.g., the Internet) via the network adapter 20. As depicted, the network adapter 20 communicates with the other components of the computer system/server 12 via the bus 18. It should be understood that although not shown, other hardware and/or software components could be used in conjunction with computer system/server 12. Examples may include, but are not limited to, microcode, device drivers, redundant processing units, external disk drive arrays, Redundant Array of Inexpensive Disks (RAID) systems, tape drives, and data archival storage systems.

Figure 2:
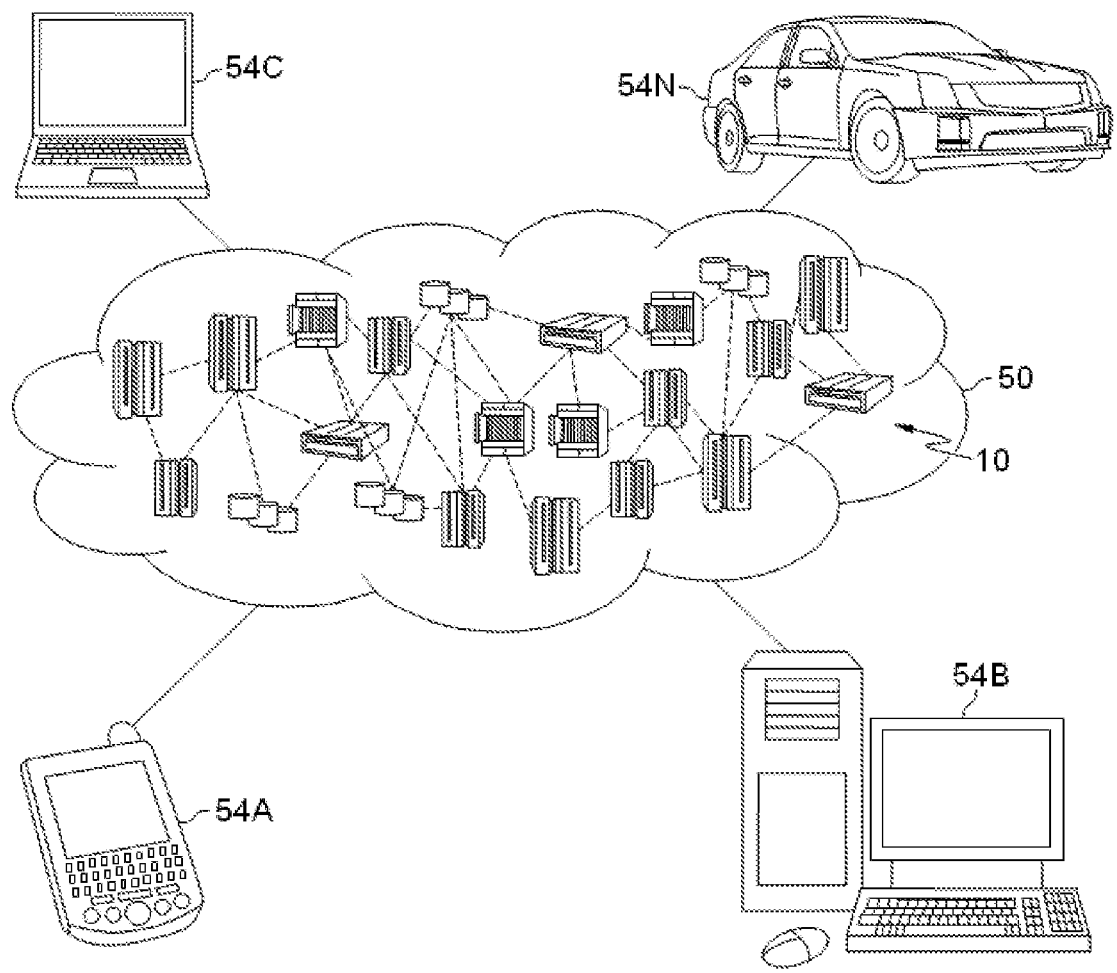
FIG. 2 illustrates a cloud computing environment according to an embodiment of the present disclosure.

Referring now to FIG. 2, the illustrative cloud computing environment 50 is depicted. The cloud computing environment 50 may be comprised of one or more cloud computing nodes 10 with which local computing devices used by cloud consumers may communicate, such as a personal digital assistant (PDA) or a cellular telephone 54A, a desktop computer 54B, a laptop computer 54C, and/or an automobile computer system 54N. The nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., a web browser).

Figure 3:
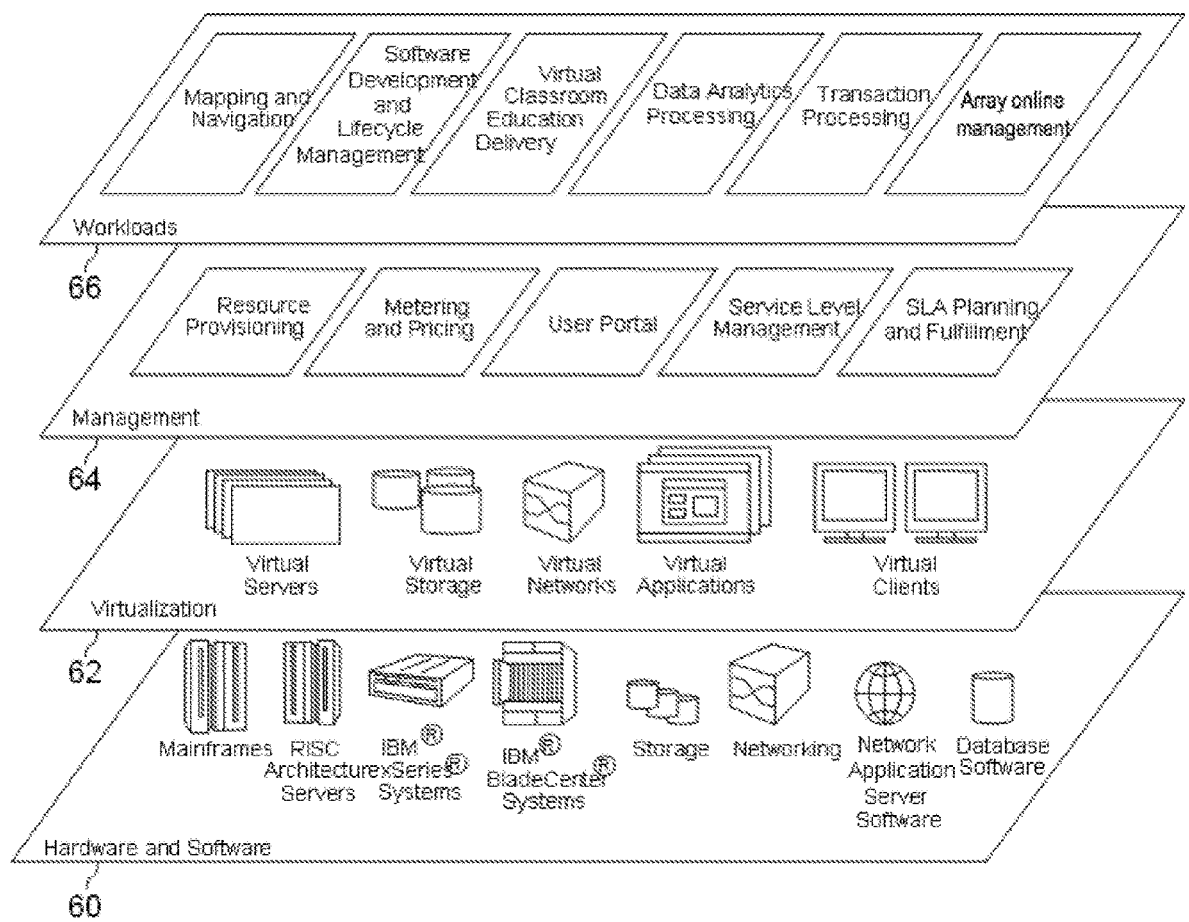
FIG. 3 illustrates abstraction model layers according to an embodiment of the present disclosure.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

The hardware and software layer 60 includes hardware and software components. Examples of hardware components include mainframes, in one example IBM® (IBM and all IBM-based trademarks and logos are trademarks or registered trademarks of International Business Machines Corporation and/or its affiliates) zSeries systems; RISC (Reduced Instruction Set Computer) architecture-based servers, in one example IBM® pSeries systems; IBM® xSeries systems; IBM® BladeCenter systems; storage devices; networks and networking components. Examples of software components include network application server software, in one example IBM® Web Sphere® application server software; and database software, in one example IBM® DB2® database software.

The virtualization layer 62 provides an abstraction layer from which the following examples of virtual entities may be provided: virtual servers; virtual storage; virtual networks, including virtual private networks; virtual applications and operating systems; and virtual clients.

In one example, the management layer 64 may provide the functions described below. Resource provisioning provides dynamic procurement of computing resources and other resources that are utilized to perform tasks within the cloud computing environment. Metering and Pricing provide cost tracking as resources that may be utilized within the cloud computing environment, and billing or invoicing for the consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 66 provides examples of functionality for which the cloud computing environment may be utilized. Examples of the workloads and functions which may be provided from this layer include: mapping and navigation; software development and lifecycle management; virtual classroom education delivery; data analytics processing; transaction processing; array online management. The functionalities of array online management will be described in the following embodiments of the present disclosure.

As mentioned above, in a storage array, it is desired to avoid data loss and ensure data security. To ensure security of the stored data, certain redundancy is often provided in a storage array, such that data recovery may be conducted when corruption occurs in a portion of data. Such storage array is also referred to as RAID. Some levels of RAID have been provided in the art, as described below.

RAID 1 is also referred to as Disk Mirroring Array. In such an array, when data is stored on a primary disk, same data is also written to a mirroring disk. When the primary disk fails, the mirroring disk will take the place of the primary disk. Data security of RAID 1 is the highest among all the RAID levels since there is a mirroring disk to perform full data backup. However, it is appreciated that, disk utilization of RAID 1 is relatively low.

RAID 2 encodes data by Error Correction Code (ECC), then partitions the encoded data into separate bits, and writes them to disks. RAID 3 and RAID 4 further utilize data interleaving storage technology to partition the encoded data, store them to disks respectively, and store parity data of different bits in a separate disk.

RAID 5 is a storage solution that comprehensively considers storage performance, data security and storage cost in balance. RAID 5 improves parallelism of data access by stripping the data and distributing data stripes to different storage devices. Specifically, in RAID 5, data and corresponding parity information are stored to respective disks forming RAID 5, and parity information and corresponding data are stored on different disks respectively. Since RAID 5 uses one parity block in each stripe to store parity information, RAID 5 may tolerate the failure of one disk. When data in one disk corrupts, the corrupted data may be restored by using data and corresponding parity information in the remaining disks. Since RAID 5 may take both data security and storage cost into consideration, it is widely applied.

RAID 6 improves data security by increasing the number of parity blocks in each stripe to two. Accordingly, RAID 6 may tolerate failure of two disks at the same time. That is to say, even if two disks in RAID 6 are failed, data in the two disks may be rebuilt from data and parity information stored in other disks. Moreover, other levels of Redundant Disk Array such as RAID 10 and RAID 50 are also provided, which may possess features in different aspects such as data security, disk utilization or read/write speed.

A copy of the data in the storage array may be mirrored to other storage to provide a higher level of data security in a storage array. Such dual or shadow copies are typically made as the application system is writing new data to the primary storage array.

Figure 4:
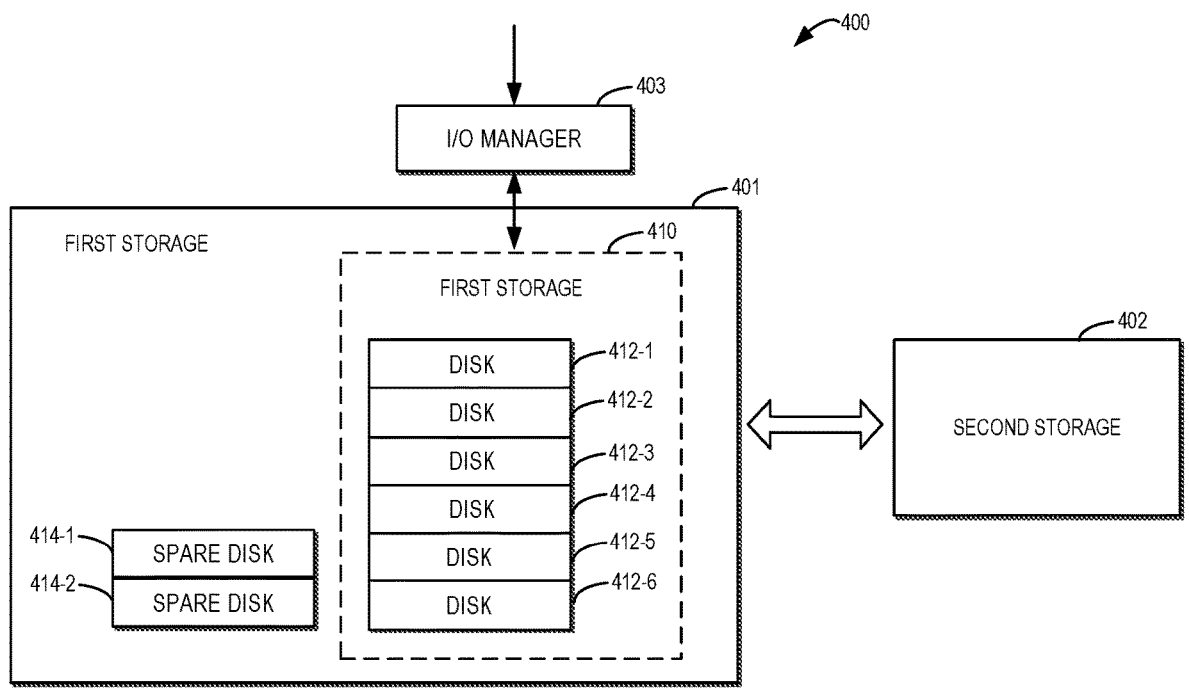
FIG. 4 illustrates a block diagram of a typical storage architecture.

FIG. 4 illustrates a storage architecture 400 including a first storage 401 and its mirrored second storage 402. In the storage architecture 400, the first storage 401 includes one or more storage arrays for storing data. As shown, the first storage 401 includes a storage array 410. The storage array 410 includes an array of storage devices/disks for storing data, from/to which the data may be read/written. In some examples, the storage array(s) in the first storage 401 may be configured as RAID. In FIG. 4, the storage array 410 is illustrated as RAID 5, including N storage devices, such as disks (e.g., disks 412-1 to 412-6 are shown and thus N=6). The disks 412-1 to 412-6 may be collectively or individually referred to as disks 412.

The storage array 410 may stripe the data across the disks configured as its member disks (e.g., disks 412-1 to 412-6). Each of the strips in the storage array 410 may include N blocks distributed across the N disks (e.g., N=6). As RAID 5, there are N−1 data blocks storing data and one parity block storing parity information. The first storage 401 may further include one or more spare disks 414-1, 414-2 that are collectively or individually referred to as spare disks 414. The spare disks 414-1, 414-2 are included as backup disks for the disks 412 of the storage array 410 in case of failures. An I/O manager 403 is configured to manage I/O requests from applications in the hosts to the storage array(s) in the first storage 401 (e.g., the storage array 410), so as to facilitate reading/writing data from/to the disks 412. In the case that one of the disks 412 failed, one of the spare disks 414 is used to replace the failed disk 412 in the storage array 410. Data in the failed disk 412 may then be rebuilt from data in other disks 412 and stored into the spare disk 414.

The storage architecture 400 further includes the second storage 402 for storing mirrored data of the data in the first storage 401, for example, the data stored in the storage array(s) of the first storage 401 (e.g., storage array 410). The second storage 402 may include one or more storage arrays for storing data. The first storage 401 may sometimes be referred to as a primary storage and the second storage 402 may sometimes be referred to as a secondary storage or a mirrored storage. In some cases, the second storage 402 may be deployed at a remote site from the storage 401 and thus may also be referred to as remote storage.

If there is new data written into the storage array 410 or other storage arrays in the first storage 401, a copy of the new data will also be duplicated to the second storage 402. Thus, the data in the first storage 401 and the data in the second storage 402 are kept synchronized. The relationship of the primary storage and the secondary storage may be referred to as a synchronous mirrored pair. The data transmitted between the storage 401 and 402 may be over a wired or wireless network.

In some embodiments, the storage configurations of the first storage 401 and the second storage 402 may be different. For example, the second storage 402 may include multiple storage arrays, one or all of which may have different RAID types and disk member counts from the storage arrays in the first storage 401.

In some storage architecture, the storage arrays are striped and grouped into higher-level abstractions of volumes or Logic Unit Numbers (LUNs), where each volume or LUN may be composed of full stride data from multiple storage arrays. In the synchronous mirrored pair configuration, each volume from the first storage 401 (i.e., primary storage 401) has a mirrored pair volume on the secondary storage 402 when they have same size and attributes. The volume abstraction hides the differences of underlying storage arrays on different sites.

The mirrored data in the second storage 402 may be used to deal with the potential failure occurred in the first storage 401. In case that the storage array 410 in the first storage 401 is not able to serve the connected hosts, for example, when multiple disks are failed in the storage array 410, the storage array 410 may be set to an offline state and the first storage 401 may swap (i.e., have a failover) to the second storage 402. In this case, I/O requests to the storage array 410 will be responded to by the second storage 402.

It would be appreciated that although one storage array 410 is illustrated to be included in the first storage 401, additional storage arrays may also be included in other implementations. The storage array 410 is illustrated as RAID 5 for convenience of description only and other types of storage arrays are also possible. Moreover, more, less, or a different number of disks may be included in the first storage other than those shown in FIG. 4.

As mentioned above, a RAID array has data recovery capability due to its redundancy. The process of restoring data in a failed disk in RAID is also called "rebuilding." The data recovery capability may generally be limited for any level of RAID. If a greater number of disks in RAID are in a failed state, the storage array may also be in a failed state since data in the failed disks cannot be recovered within this storage array. For example, in RAID 5, if two disks are failed, it may not be possible to rebuild data in the failed disks from data stored in other disks in RAID 5. In RAID 6, if three disks are failed, it also may not be possible to rebuild data for the failed disks. According to conventional schemes, if an unrecoverable error occurs, the storage array will be set to an offline state and a failover or swap is performed from the storage array to the second storage so as to use the mirrored data in the second storage to serve I/O requests for that storage array.

However, the swap or failover to the mirrored second storage may not be beneficial. The host applications may experience a performance drop in the failover to the mirrored second storage since the mirrored second storage may be deployed at a remote location from the primary storage array. Additionally, the performance drop may also be due to the cache in the mirrored second storage and the multiple tier storage data requiring time to warm up or to be re-distributed. In addition, the mirrored second storage may not afford another array-level failure before the primary storage array is completely repaired, which will highly increase the risk of data security.

According to embodiments of the present disclosure, there is proposed a solution for maintaining a storage array online. If an unrecoverable error has occurred in a failed disk of a storage array in first storage, instead of directly setting this storage array into an offline state or performing a failover to second storage storing mirrored data, the failed disk is replaced with a spare disk, and data in the second storage is retrieved in unit of stripes to be stored into the storage array. The stripe includes data blocks distributed across all disks in the storage array and the mirrored data for the failed disk may be retrieved from the second storage to support the working of the storage array in the first storage. Thus, the storage array is maintained in an online state even if an unrecoverable error has occurred.

Figure 5:
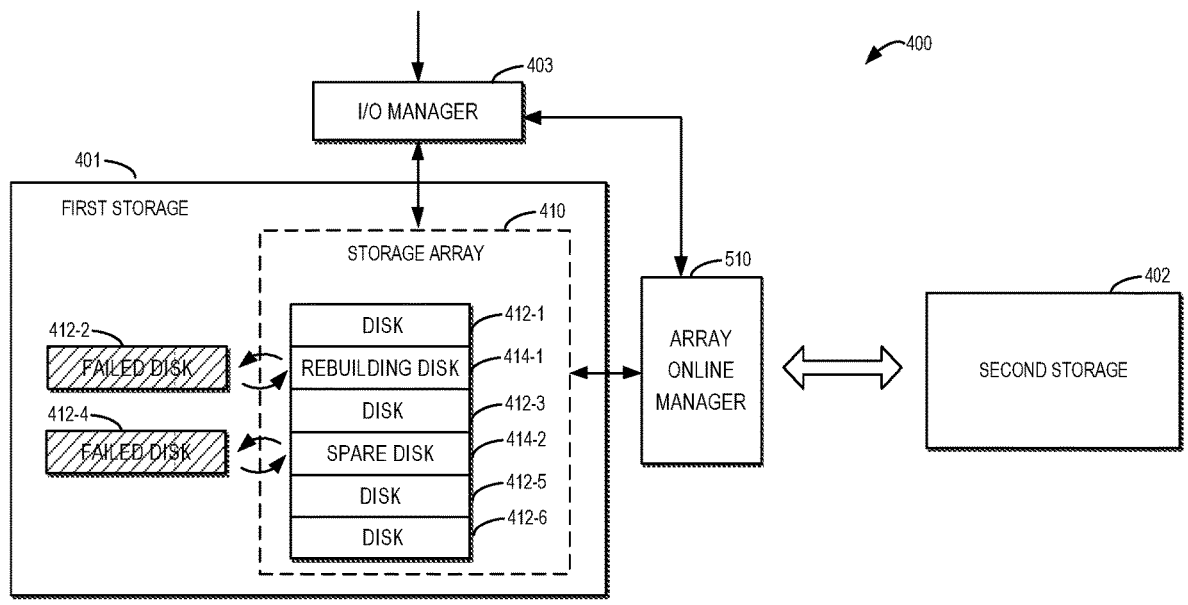
FIG. 5 illustrates a block diagram of a storage architecture according to an embodiment of the present disclosure.

Example embodiments of the present disclosure will be described below. Reference is now made to FIG. 5, which illustrates that an array online manager 510 is introduced in the storage architecture 400 of FIG. 4 to manage the storage array 410. The array online manager 510 is configured to perform the functionalities as described in the embodiments of the present disclosure. The array online manager 510 may be implemented by one or more processors. In some embodiments, the array online manager 510 may be implemented in a computing device, such as the computer system 12 in FIG. 1 or distributed across two or more physical computing devices. In some examples, part or all functionalities of the array online manager 510 may be deployed in the same computing device with the I/O manager 403.

The array online manager 510 is configured to maintain the storage array 410 online in case of some unrecoverable error occurs in this array. As used herein, an "unrecoverable error" refers to an error where data in a failed disk of the storage array 410 may not be rebuilt from data in one or more other disks in the storage array 410.

Due to data redundancy, the storage array 410 has the data recovery capability. However, the data recovery capability is limited depending on the RAID level. In the example of RAID 5 shown in this figure, if one of the disks 412 has failed, the disk data may be rebuilt from data and parity information stored in other disks 412. If two or more disks are failed before the previous failed disk has been successfully rebuilt, the storage array 410 may not be capable of rebuilding the data in the failed disks based on data in other disks.

For example, if the disk 412-2 is failed and is replaced by the spare disk 414-1, data in the failed disk 412-2 may be rebuilt from data and parity information stored in other disks 412 and then stored into the rebuilding disk 414-1. The data rebuilding may cost a certain period of time. If a failure of the disk 412-4 happens during this period, data in the failed disk 412-4 cannot be rebuilt from data and parity information in other disks in the storage array 410 since the data rebuilding in the disk 414-1 has not been successfully completed. The remaining data in the failed disk 412-2 may not be rebuilt. As a result, an unrecoverable error occurs in the storage array 410. In the above description, an unrecoverable error in RAID 5 has been discussed by way of example. For other levels of RAID, an unrecoverable error may occur in other conditions. For example, in RAID 6, if more than two disks are failed, then an unrecoverable error occurs in the failed disks.

Figure 6:
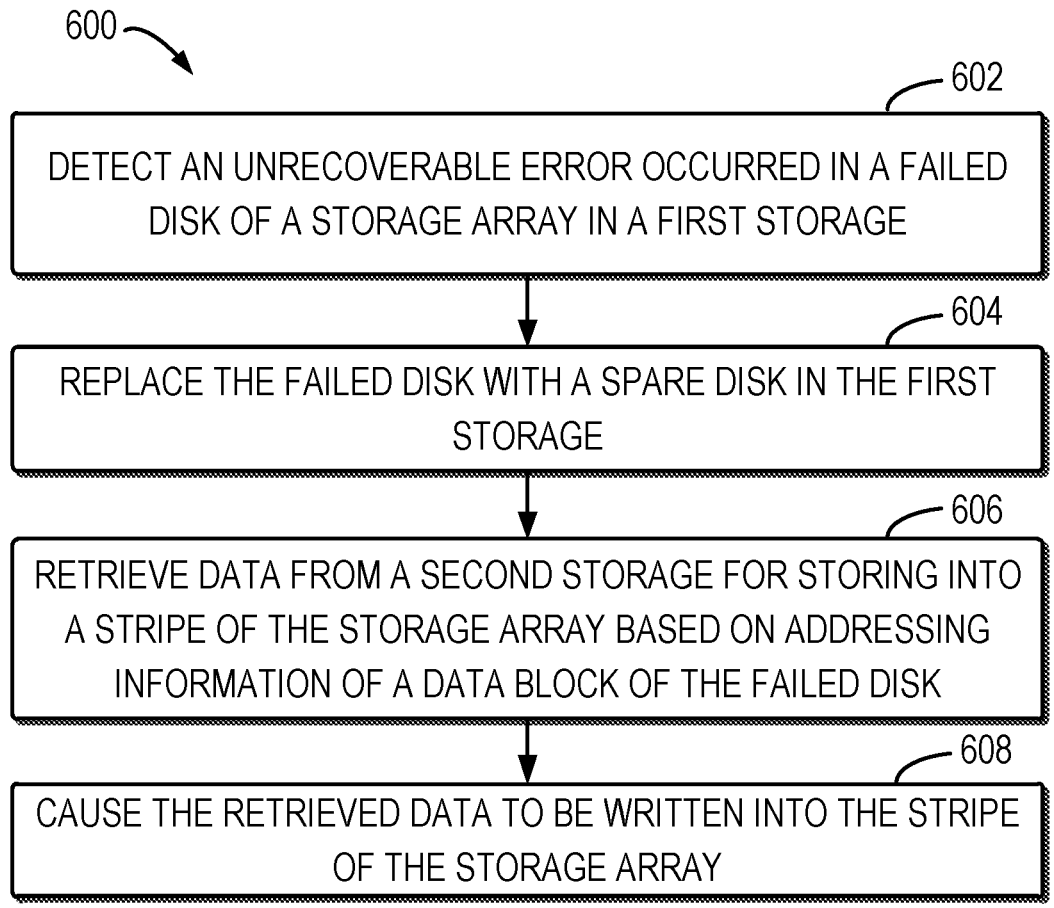
FIG. 6 illustrates a flowchart of a process for maintaining a storage array online according to an embodiment of the present disclosure.

According to embodiments of the present disclosure, instead of directly performing a swap or failover to the second storage 402, the array online manager 510 will attempt to maintain the storage array 410 online. FIG. 6 illustrates a flowchart of a process 600 for maintaining a storage array implemented at the array online manager 510 in accordance with some embodiments of the present disclosure. For convenience of explanation, the process 600 is described with reference to FIG. 5.

Specifically, at block 602, the array online manager 510 detects an unrecoverable error occurred in a failed disk of the storage array 410. In the example of FIG. 4, if the disk 412-4 is failed during the process of data rebuilding for the failed disk 412-1, data in the failed disk 412-4 may not be rebuilt from data and parity information stored in other disks in this array and thus the array online manager 510 detects that an unrecoverable error has occurred in the failed disk 412-4. In response to detecting the unrecoverable error at 604, the array online manager 510 replaces the failed disk 412-4 with a spare disk 414-2 in the first storage 401. The array online manager 510 may indicate to the storage array 410 or its controller that the spare disk 414-2 takes the place of the failed disk 412-4 and is considered as a member disk of the storage array 410.

In the embodiments of the present disclosure, although an unrecoverable error has occurred, the storage array 410 is still maintained in an online state by replacing the failed disk with the spare disk. The I/O manager 403 may continue to manage the I/O requests to the online storage array 410. I/O requests to the normal disks (i.e., disks 412-1, 412-3, 412-5 and 412-6 and possibly to the rebuilt part of disk 414-1) may be executed without any impact. For example, if the I/O manager 403 receives I/O requests to read/write data from/to any of the disks 412-1, 412-3, 412-5, and 412-6 and to data blocks of the rebuilding disk 414-1 that have data rebuilt, then the requests may be successfully executed.

However, since data in the failed disk 412-4 cannot be rebuilt to the spare disk 414-2 due to the unrecoverable error, the I/O request to one or more data blocks in the failed disk 412-4 may not be successfully completed because no data is stored in its backup disk 414-2. To maintain operations of the storage array 410, the array online manager 510 retrieves, at block 606, data from the second storage 402 for storing into a stripe of the storage array 410 based on address information of a data block of the failed disk 412-4.

As synchronous mirrored storage, the second storage 402 has stored data that is mirrored to the storage array 410, including the data that is currently stored in the normal disk and data that was stored in the failed disk(s). Such mirrored data may be utilized when the unrecoverable error occurs in the first storage 401. In some embodiments, when detecting the occurrence of an unrecoverable error, the array online manager 510 may check if all of the data has been synchronized from the first storage 401 to the second storage 402. For example, one method to check if all of the data has been synchronize is to check if the data in the cache has been mirrored to the second storage 402. If there is still data not being synchronized, the data will be first replicated from the first storage 401 to the second storage 402. The data synchronization may be monitored, for example, by a component responsible for data replication in the first storage 401. The array online manager 510 may check with the component responsible for data replication to verify if the data has been synchronized. In some embodiments, when the data synchronization is completed, the array online manager 510 may proceed with the retrieving of data from the second storage 402.

In embodiments of the present disclosure, data is retrieved from the second storage 402 in units of stripes. A stripe of the storage array 410 may include a group of data blocks distributed across all of the disks in the storage array 410 and each data block may be from one disk. In the example of FIG. 4, since the failed disk 412-4 has been replaced with the spare disk 414-2, the disks in the storage array 410 include disks 412-1, 414-1, 412-3, 414-2, 412-5, and 412-6. Data blocks in a storage array may be set to the same size, and the size of the stripe may be the size of a data block multiplied by the number of data blocks in the stripe. The data may be retrieved from the second storage 402 and stored in units of stripes in the storage array 410, which may be similar to the data rebuilding process where data is rebuilt stripe by stripe. The data retrieving in unit of stripes may be referred to as data retrieving in full stride and the retrieved data may be referred to as full stride data.

There may be a mapping of address information between the data stored in the first storage 401 and data stored in the second storage 402. The address information of the data stored in the first storage 401 and data stored in the second storage 402 may be the same address or may be a different address, depending on the storage configuration. If different configurations are used in the first storage 401 and the second storage 402, in order to retrieve data for a stripe of the storage array 410 from the second storage 402, the array online manager 510 may map address information of the data block of the failed disk 412-4 to the address information of a storage space storing the data to be retrieved in the second storage 402. Further, a request may be made for the data from the second storage 402 by sending the mapped address information of the storage space to the second storage 402 and then the data may be received from the second storage 402.

The data blocks in a disk may be assigned with a unique Logic Block Address (LBA). The address information of a data block may be the LBA of the block in one example. In other examples, other information that may be used to address the data block in the failed disk 412-4 may also be used as the address information. In some embodiments, more than one data block in the failed disk 412-4 may be considered and thus a range of LBA or other information address the data blocks may also be used.

The data to be retrieved is of a full stripe size in the storage array 410 but may occupy either a full stripe, part of a stripe, or more than one stripe in the second storage 402. Thus, in mapping the address information, the array online manager 510 may determine address information of the stripe of the storage array 410 based on the address information of the data block of the failed disk 412-4, and then map the address information of the stripe to the address information of data block(s) or stripes(s) storing the data to be retrieved in the second storage 402.

If the second storage 402 includes storage arrays, the storage space storing the data may be one or more data blocks in the array. As mentioned above, in the high-level of volume abstraction, the volumes in the first and second storage 401 and 402 are mirrored and have the same size and attributes. In this case, to facilitate data retrieving from the second storage 402, the array online manager 510 may translate the address information of the data block in the failed disk 412-4 into a volume offset and a data length of the data block. The array online manger 510 may then extend the volume offset and data length of the data block to be a corresponding volume offset and a length of the data to be retrieved for a stripe of the storage array 410. With the extended volume offset and data length, the second storage 402 may read the corresponding data from its storage devices and provide the data to the array online manager 510.

At block 608, the array online manager 510 causes the retrieved data to be written into the stripe of the storage array 410. For example, the array online manager 510 may provide the retrieved data to the storage array 410 or to a controller that control data writing/reading to/from stripes of the storage array 410.

In some embodiments, retrieving the data from the second storage 402 may be triggered by failures of real-time I/O requests caused by the unrecoverable error during operations of the storage array 410. As such, the retrieved data may be used to complete the I/O requests. Alternatively, or in addition to, retrieving the data from the second storage 402 may be triggered by a background process. In this way, the data in the failed disk 412-4 may be restored from the mirrored data in the second storage 402. The two types of triggers will be described in detail below.

Figure 7:
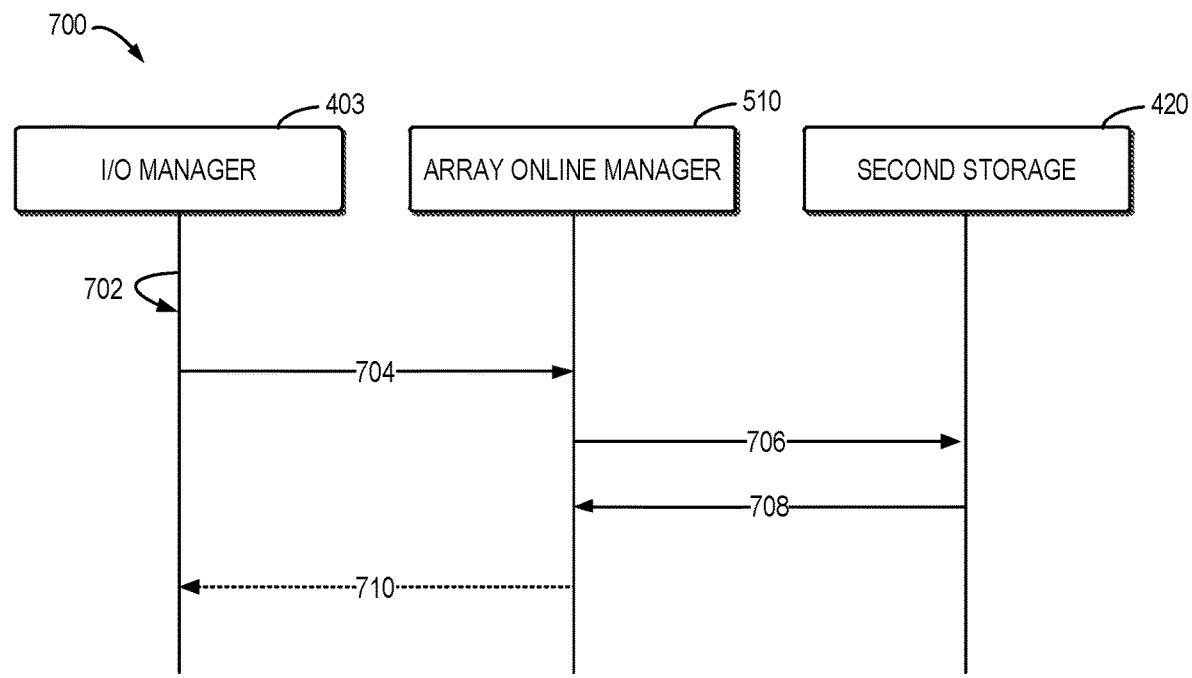
FIG. 7 illustrates a flowchart of a process of communication between components in the storage architecture according to an embodiment of the present disclosure.

FIG. 7 illustrates a flowchart illustrating a process 700 of communication between the I/O manager 403, the array online manager 510, and the second storage 402 in the case of receiving a request to read data from the storage array 410.

Typically, a request to read data from the storage array 410 is sent from an application in a host to the I/O manager 403. Upon reception of the read request, the I/O manager 403 detects (702) whether a failure of the read request has occurred in a data block(s) of the failed disk 412-4. In many cases, the first storage 401 may include one or more cache devices or one or more non-volatile storage (NVS) devices for caching part of the data stored in the storage array 410 for rapid access. If the data to be read is cached (i.e., the I/O manager 403 detects a cache hit for the read request), the I/O manager 403 may directly return the cached data to the host, without requiring access to the storage array 410.

In the case that some or all of the data to be read by the host is not cached, the I/O manager 403 may initiate a request to read the data that is not cached from the storage array 410. If the address information of the data to be read by the read request is directed to one or more data blocks of normal disks in the storage array 410 except the spare disk 414-2, the data may be successfully read from the corresponding data blocks and thus the I/O manager 403 may return the host with the requested data. In other cases, if address information of the data in the read request is directed to one or more data blocks of the failed disk 412-4, due to the unrecoverable error occurred in the failed disk 412-4, the I/O manager 403 detects that a failure of the read request has occurred in the data block(s) of the failed disk 412-4.

Upon detecting of the failure of the read request, the I/O manager 403 transmits (704) an indication to the array online manager 510 to indicate this failure. This indication may include the address information of the data block(s) of the failed disk 412-4 in which the failure has occurred. In some cases, the I/O manager 403 may directly transmit a request for the data in the data block(s) of the failed disk 412-4 to the array online manager 510. With the indication or request from the I/O manager 403, the array online manager 510 may determine that a failure of a read request has occurred in the data block(s) of the failed disk 412-4.

In response to this failure, the array online manager 510 requests (706) the second storage 402 for the data to be retrieved. Here the data to be retrieved is the data for storing into a stripe of the storage array 410, which includes not only data stored in the data block of the failed disk 412-4 but also data in other data blocks comprised in the stripe. Address information of the storage space storing the data to be retrieved in the second storage 402, which is mapped from the address information of the data block in the failed disk 412-4, may be included in the request sent to the second storage 402 or to a controller (such as an I/O manager) of the second storage 402.

In response to receiving the request for the data from the array online manager 510, the second storage 402, or the controller of the second storage, sends (708) the requested data to the array online manager 510. Thus, the array online manager 510 may retrieve the data for the stripe of the storage array 410 from the second storage 402 and then cause the retrieved data to be written into the corresponding stripe of the storage array 410.

In some embodiments, the array online manager 510 may provide (710) the retrieved data to the I/O manager 403, as a response to the I/O request. The I/O manager 403 may cache the retrieved data in its cache device(s) or NVS device(s). Since the retrieved data may include data that is mirrored to the data stored in the data block of the failed disk 412-4, the I/O manager 403 may successfully complete the read request from the host using the retrieved data.

Figure 8:
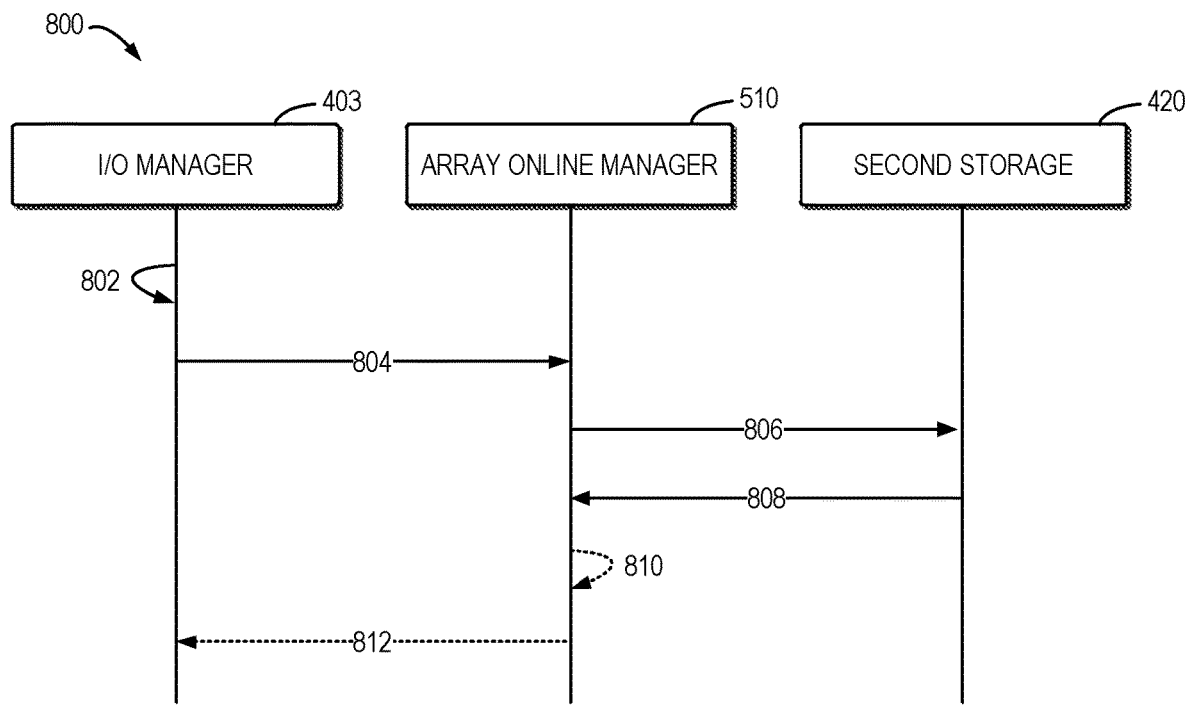
FIG. 8 illustrates a flowchart of a process of communication between components in the storage architecture according to another embodiment of the present disclosure.

FIG. 8 illustrates a flowchart illustrating a process 800 of communication between the I/O manager 403, the array online manager 510, and the second storage 402 in the case of receiving a request to write new data to the failed disk 412-4 in the storage array 410.

Typically, a request to write new data to the storage array 410 is sent from an application in a host to the I/O manager 403. Upon reception of the write request, the I/O manager 403 detects (802) whether a failure of the write request has occurred in a data block(s) of the failed disk 412-4. The failure of the write request occurs due to failing to write the new data into its destination address.

To better understand how a failure of the write request may occur, a typical data write process is briefly introduced below. The I/O manager 403, when receiving a write request, may detect whether new data in the write request can be cached into the cache devices or NVS devices and then wait for an appropriate time to flush the cached data into the storage array 410.

If the cache device or NVS devices have no available storage space for caching the new data, the I/O manager 403 may decide to directly write the new data into the storage array 410. The new data may be placed in a waiting queue. The data arrived at an early time in the queue will be processed first. If part or all of the new data is to be written into one or more data blocks of normal disks in the storage array 410 except for the spare disk 414-2, the new data may be successfully written. If part or all of the new data is to be written into one or more data blocks of the failed disk 412-4, the writing will be directed to the corresponding block(s) of the spare disk 414-2, which is currently taking the place of the failed disk 412-4 due to the unrecoverable error. However, this writing may not be successfully completed because there is no old data present in the data blocks of the spare disk 414-2. In case where part or all of the new data cannot be successfully written, the I/O manager 403 detects that a failure of the write request has occurred in the data block(s) of the failed disk 412-4.

In some other cases that the new data can be cached, the I/O manager 403 may synchronize the cached new data to the cache or NVS device(s) in the second storage 402 and then notify the host that the write request is successfully completed. At an appropriate time, depending on the cache flush mechanism utilized in the storage system, the I/O manager 403 may write the cached new data into the storage array 410. If the new data is to be written into one or more data blocks of normal disks in the storage array 410, except the spare disk 414-2, the write request is successfully completed within the first storage 401. If part or all of the new data is to be written into one or more data blocks of the failed disk 412-4, the writing will be directed to the corresponding block(s) of the spare disk 414-2. However, the writing may not be successful because data in the spare disk 414-2 has not been rebuilt. In this case, the I/O manager 403 detects that a failure of the write request has occurred in the data block(s) of the failed disk 412-4 although the host has been notified the successful writing.

Upon detecting of the failure of the write request, the I/O manager 403 transmits (804) an indication to the array online manager 510 to indicate this failure. The indication may include address information of the data block(s) of the failed disk 412-4 in which the failure has occurred. In some examples, the I/O manager 403 may directly transmit a request for rebuilding the data in the data block(s) of the failed disk 412-4 to the array online manager 510. Upon receiving such a request, the array online manager 510 may also determine that a failure of a write request has occurred in the data block(s) of the failed disk 412-4.

In response to this failure, the array online manager 510 requests (806) the second storage 402 for the data to be retrieved. Here the data to be retrieved is data for storing into a stripe of the storage array 410, which includes not only data stored in the data block of the failed disk 412-4 but also data in other data blocks included in the stripe. A data block of the failed disk 412-4, in which a failure of the write request occurred, may include either valid or dummy old data that have been mirrored to the second storage 402. Address information of the storage space storing the data to be retrieved in the second storage 402, which is mapped from the address information of the data block in the failed disk 412-4, may be included in the request sent to the second storage 402 or a controller (e.g., an I/O manager) of the second storage 402.

In response to receiving the request for the data from the array online manager 510, the second storage 402, or the controller of the second storage, sends (808) the requested data to the array online manager 510. Thus, the array online manager 510 may retrieve the data for the stripe of the storage array 410 from the second storage 402 and then cause the retrieved data to be written into the corresponding stripe of the storage array 410.

In some embodiments, to facilitate the writing of the retrieved data, the array online manager 510 adds (810) a flag into the retrieved data and then sends the retrieved data together with the flag to the storage array 410. The flag indicates to the storage array 410 to write the retrieved data in a rebuild-before-write path. With the flag, the storage array 410 may suspend data writing to this array triggered by normal I/O access and write the retrieved data from the array online manager 510 first because the data is used to rebuild the stripe of the storage array 410.

In some embodiments, the array online manager 510 provides (812) an indication to the I/O manager 403 to indicate that data in the data block of the failed disk 412-4 has been rebuilt to the spare disk 414-2. The I/O manager 403 may then re-write the new data to the spare disk 414-2. In some other embodiments, the explicit indication from the array online manager 510 may be omitted and the I/O manager 403 may attempt to re-write the new data depending on predefined re-writing cycles.

According to the embodiments of read and write requests as described above, by retrieving from the second storage 402 data in a full stripe including the data block in which a read/write failure occurs, it may be possible to rebuild the data of the failed disk 412-4 into the spare disk 414-2 and successfully complete the read/write request that is directed to the failed disk 412-4. Thus, the negative impact due to the disk failure may be reduced. The host I/O requests may still be served by the storage array in the first storage 401 instead of the second storage 402 that is incapable of providing high I/O access performance. In addition, since the storage array 410 is maintained in the online state for use, new or updated data in this array may still be mirrored to the second storage 402, thereby maintaining high data security in the whole storage architecture.

Figure 9:
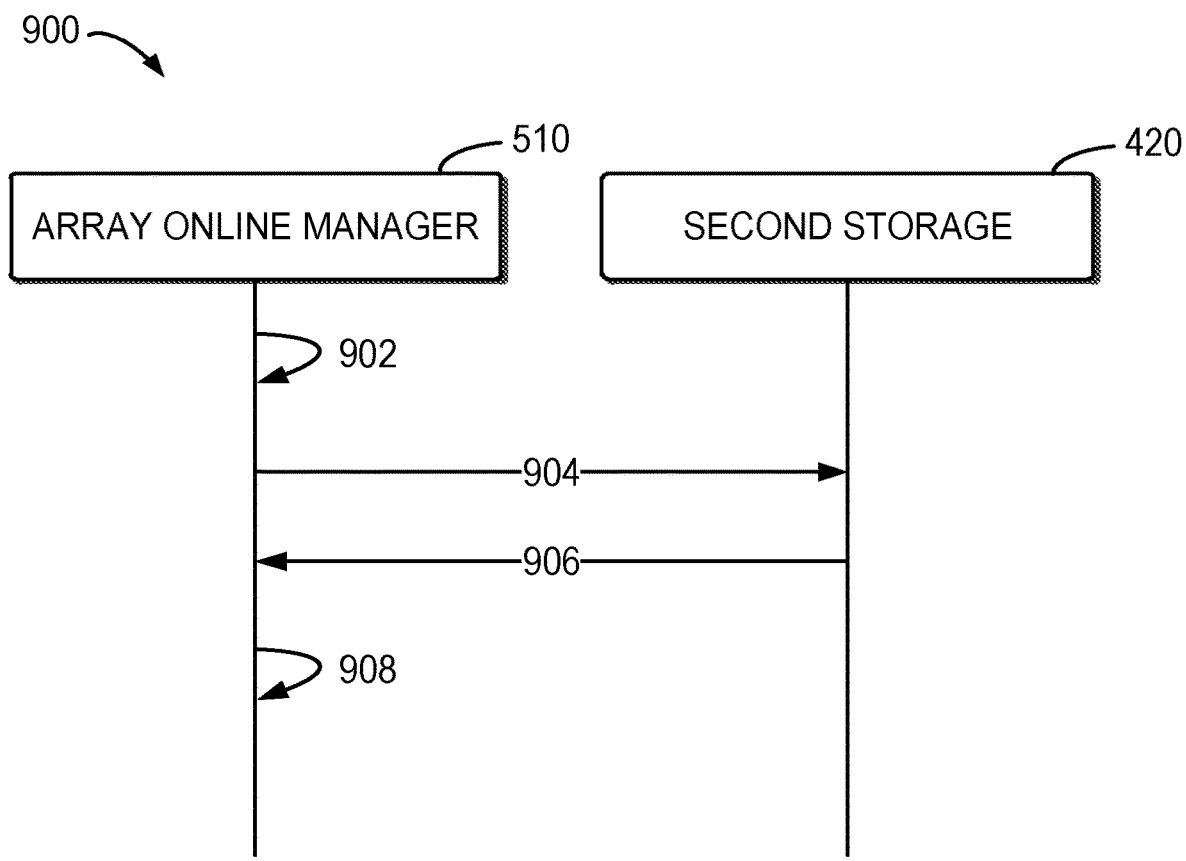
FIG. 9 illustrates a flowchart of a process of communication between components in the storage architecture according to a further embodiment of the present disclosure.

As mentioned above, in addition to or as an alternative of the real-time I/O requests, retrieving data from the second storage 402 may also be triggered by a background process. In this way, mirrored data in the second storage 402 may be used to rebuild the data in the failed disk 412-4 into the spare disk 414-2 with a background operation. FIG. 9 illustrates a flowchart illustrating a process 900 of communication between the array online manager 510 and the second storage 402 in the case of using a background to retrieve data from the second storage 402.

By running the background process, the array online manager 510 may determine (902) which data in the data block of the failed disk 412-4 may be rebuilt. The array online manager 510 may use a rebuilding bitmap to determine which data may be rebuilt. A rebuilding bitmap may include one or more bits indicating whether data in a data block or a stripe of a storage array may be rebuilt. For example, if a disk of the storage array is failed, the corresponding bits in the bitmap may be marked as a value indicating that data in the data blocks or stripes including the data blocks of this disk may be rebuilt (e.g., a value of "1"). If data the corresponding data blocks or stripes have been rebuilt, the corresponding bits may be clear (e.g., set to be "0").

The array online manager 510 may start from the beginning of the bitmap to search for the data block of the failed disk 412-4 in which data is to be rebuilt. If the rebuilding bitmap (e.g., a corresponding bit in the bitmap) indicates that data in the data block of the failed disk is to be rebuilt, the array online manager 510 requests (904) from the second storage 402 for the data to be retrieved. Here the data to be retrieved is the data for storing into a stripe of the storage array 410, which includes not only data stored in the data block of the failed disk 412-4 but also data in the other data blocks comprised in the stripe. Address information of the storage space storing the data to be retrieved in the second storage 402, which is mapped from the address information of the data block in the failed disk 412-4, may be included in the request sent to the second storage 402 or a controller (e.g., an I/O manager) of the second storage 402.

In response to receiving the request for the data from the array online manager 510, the second storage 402, or the second storage controller, sends (906) the requested data to the array online manager 510. Thus, the array online manager 510 may retrieve the data for the stripe of the storage array 410 from the second storage 402 and then cause the retrieved data to be written into the corresponding stripe of the storage array 410. Further, the array online manager 510 updates (908) the rebuilding bitmap to indicate that data in the data block has been rebuilt. For example, the array online manager 510 may change the value of one or more corresponding bits in the rebuilding bitmap to indicate that data in the corresponding data block has been rebuilt.

The background process may continue to retrieve data for other data blocks in the failed disk 412-4 that require data rebuilding. In this way, data in the failed disk 412-4 may be recovered in either the processing of real-time I/O accesses or the background data rebuilding using mirrored data in the second storage 402, which may accelerate the I/O access to the storage array 410 after the unrecoverable error occurs.

Figure 10:
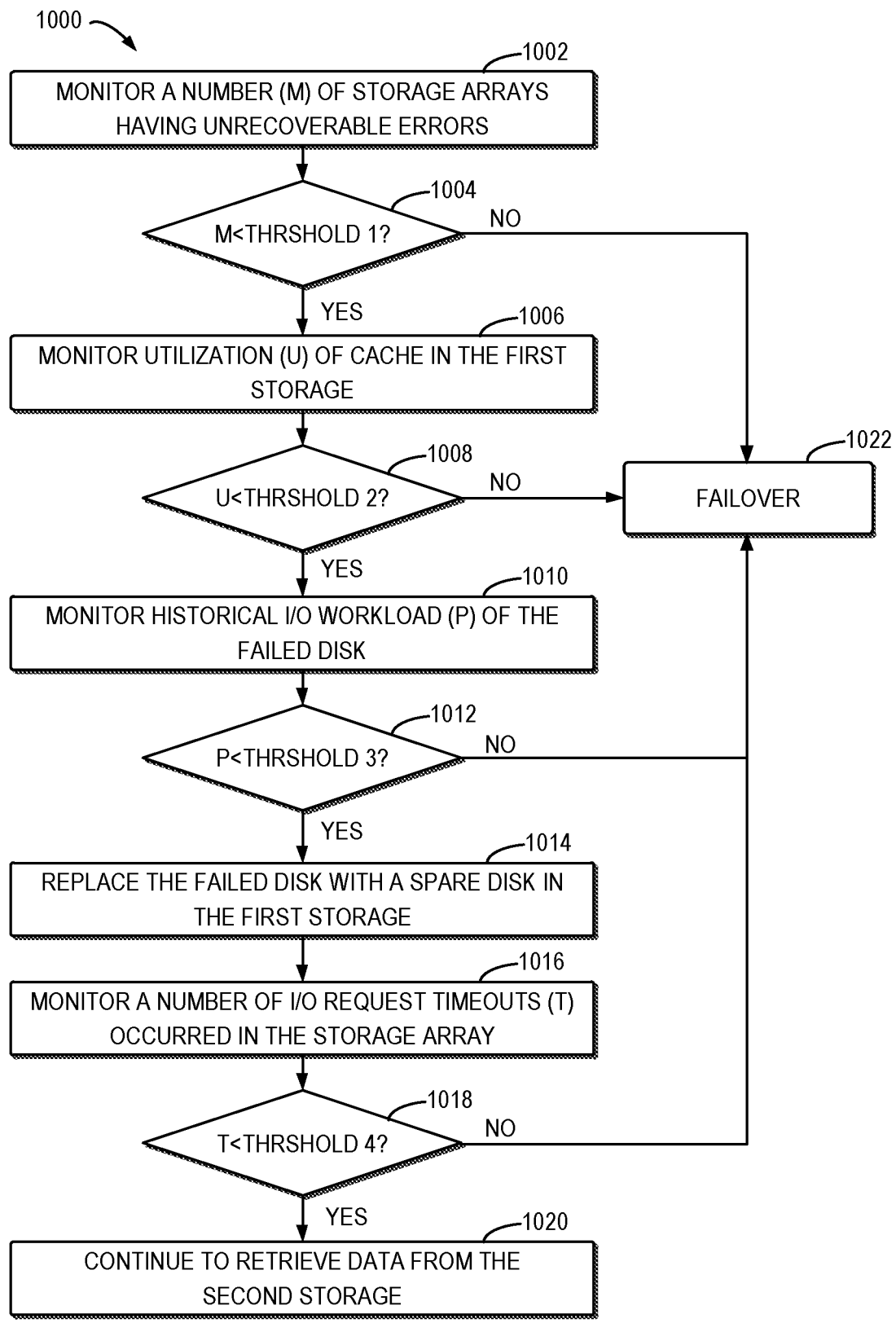
FIG. 10 illustrates a flowchart of a process of maintaining a storage array online according to an embodiment of the present disclosure.

As discussed above, the array online manager 510 operates to maintain the storage array 410 online upon detecting an unrecoverable error. In some embodiments, in case of the unrecoverable error, the array online manager 510 may monitor some other factors to determine whether to maintain the array online or to perform a failover to the second storage 402. FIG. 10 illustrates a process 1000 of maintaining a storage array online in accordance with some embodiments of the present disclosure. The process 1000 may be implemented at the array online manager 510.

At block 1002, the array online manager 510 monitors a number, represented as "M", of storage arrays of the first storage 401 in which unrecoverable errors have occurred. In addition to the storage array 410, the first storage 401 may include one or more other storage arrays (not show in FIG. 4). The unrecoverable errors occurred in all the storage arrays may be monitored by the array online manager 510. At block 1004, the array online manager 510 determines whether the monitored number M is blow or exceeds a corresponding threshold. If many storage arrays in the first storage 401 all suffer from unrecoverable errors, which means that there may be a system-level error, then the array online manager 510 decides to initiate a failover from the storage array 410 to the second storage 402 at block 1022. For example, the array online manager 510 may perform the failover itself or indicate to a controller that a failover from the storage array 410 to the second storage 402 is needed. The threshold for the monitor number of storage arrays with unrecoverable errors may be set depending on the total number of arrays included in the first storage 401 and any practical requirements on tolerance of the system-level error.

If the array online manager 510 determines that the monitored number M is below the corresponding threshold, then the array online monitor 510 may further monitor other factors. The array online monitor 510 may monitor, at block 1006, utilization, represented as "U", of cache in the storage array 410 and determine, at block 1008, whether the utilization U is below or exceeds a corresponding threshold. An indication that the storage array 410 is frequently accessed may be if the cache (e.g., the cache space of the cache devices or NVS devices) is almost fully utilized and only limited available cache is remaining. The array online monitor 510 may decide to initiate a failover from the storage array 410 to the second storage 402 at block 1022 if it determines that the utilization U exceeds the threshold. Otherwise, the array online manager 510 may continue to monitor other factors. The threshold for the monitored utilization may be set as any value according to any practical requirements.

At block 1010, the array online manager 510 monitors historical I/O workload, represented as "P", of the failed disk 412-4 within a predetermined time period. For example, the array online manager 510 may monitor the number of I/O requests to the failed disk in last hour, last two hours, or a different previous time period. At block 1012, the array online manager 510 may determine whether the monitored historical I/O workload P is below or exceeds a corresponding threshold. If the failed disk 412-4 had a high I/O workload, it may mean that the failed disk 412-4 was frequently accessed and thus the failure of this disk might likely decrease the performance of the storage array. Thus, the array online manager 510 may decide to initiate a failover from the storage array 410 to the second storage 402 at block 1022 in response to the historical I/O workload exceeding the corresponding threshold. The threshold for the monitored historical I/O workload may be set as any value according to the practical requirements.

If the historical I/O workload is also determined to be below the corresponding threshold, at block 1014, the array online manager 510 may decide to replace the failed disk 412-4, in which the unrecoverable error has occurred, with the spare disk 414-2 in the storage array 410. Then the data from the second storage 402 may be retrieved and stored into the spare disk in unit of stripes, as previously described.

During the data retrieving for the spare disk, the array online manager 510 may monitor, at block 1016, that a number of I/O request timeouts, represented as "T", occurred in the storage array 410 and may determine, at block 1018, whether the number of I/O request timeouts T is below or exceeds a corresponding threshold. An I/O request timeout may be caused by a failure of reading/writing data from/to the storage array 410 during the period where data in the failed disk has not completely rebuilt into the spare disk, or by other possible errors in the storage array 410. If the number of I/O requests timeouts exceed the corresponding thresholds, the array online manager 510 may abort the data retrieving from the second storage 402 and initiate a failover from the storage array 410 to the second storage 402 at block 1022. Otherwise, the array online manager 510 may continue to retrieve data from the second storage 402 in unit of stripes at block 1020.

In some embodiments, during the data retrieving for the spare disk, the array online manager 510 may also monitor the number of storage arrays in which unrecoverable errors have occurred in the first storage 401 or the utilization of cache for the storage array, in addition to the number of I/O request timeouts. If one or more of the factors exceeds their corresponding thresholds, the array online manager 510 may determine to abort the data retrieving and instead perform the normal handover as it monitors that the risk of a system failure becomes higher.

According to the embodiments of the present disclosure as described above, the array online manager 510 may determine whether to maintain the storage array 410 online in case of the unrecoverable error by monitoring one or more related factors and determining whether to abort or continue the data retrieving. It would be appreciated that the array online manager 510 may not need to monitor and compare the factors with their corresponding thresholds in the order shown in FIG. 9. In some other embodiments, the array online manager 510 may monitor and compare the factors with their corresponding thresholds in parallel with each other or in a different order as shown in FIG. 9. In some embodiments, the array online manager 510 may decide to perform a failover after monitoring that two or more of the factors exceed their corresponding thresholds.

It would be appreciated that although the storage array 410 is described as RAID 5, in other examples, other types of storage arrays, such as RAID 1, RAID 2, RAID 6, RAID 10, and RAID 50, may also be included in the storage system and the array online manager 510 of the present disclosure may be utilized to maintain the arrays online in a similar manner in case unrecoverable errors occur in any of the arrays. In some embodiments, if an unrecoverable error has occurred in two or more failed disks 412 in the storage array 410, the failed disks may also be replaced with respective spare disks and then the data retrieved from the second storage 402 in unit of stripes may be stored into the spare disks. The scope of the present disclosure is not limited in these regards.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining a storage array online when an unrecoverable error has occurred comprising:
   a storage architecture that includes a first storage, a second storage, one or more arrays in the first storage, and multiple disks in each storage array, wherein the second storage stores mirrored data of the first storage;
   detecting an unrecoverable error occurred in the first storage, wherein the unrecoverable error occurred in a failed disk during a process of rebuilding data for the failed disk;
   replacing the failed disk in the first storage with a spare disk from the first storage where the unrecoverable error occurred while the first storage remains in an online state;
   retrieving data from the second storage based on address information of a data block of the failed disk, wherein the data from the second storage has been verified to be synchronized with the first storage, wherein the data from the second storage is retrieved in units of stripes, wherein the data of the second storage is retrieved by mapping the address information of the data block of the failed disk to a secondary storage address; and
   causing the retrieved data to be written to the spare disk of the first storage.

2. The method of claim 1, wherein retrieving of the data further comprises:
   retrieving the data from the second storage with a background operation in response to a rebuilding bitmap indicating that the data block of the failed disk is to be rebuilt.

3. The method of claim 1, wherein the replacing of the failed disk further comprises:
   monitoring a plurality of factors, wherein the plurality of factors includes a number of storage arrays of the first storage in which unrecoverable errors have occurred, utilization of cache in the first storage, historical I/O workload of the failed disk within a predetermined time period, and a number of I/O request timeouts occurred in the first storage; and
   replacing the failed disk in response to the at least one of the factors being below a corresponding threshold.

4. The method of claim 1, wherein the retrieving the data from the second storage further comprises:
   retrieving the data from the second storage in response to a failure of an I/O request caused by the unrecoverable error.

5. The method of claim 4, wherein the I/O request further comprises;
   requesting to read data from the data block of the failed disk; and
   providing the retrieved data based on the request.

6. The method of claim 4, wherein the I/O request further comprises;
   requesting to write new data into the data block of the failed disk; and
   causing the new data to be written into a data block of the spare disk after the data has been written into a stripe.

7. The method of claim 6, further comprises:
   updating a rebuilding bitmap to indicate that data in the data block of the failed disk has been rebuilt in response to the data having been written to the stripe.

8. A system for maintaining a storage array online when an unrecoverable error has occurred comprising:
   a processing unit; and
   a memory coupled to the processing unit and storing instructions thereon, the instructions, when executed by the processing unit, performing acts including:
   a storage architecture that includes a first storage, a second storage, one or more arrays in the first storage, and multiple disks in each storage array, wherein the second storage stores mirrored data of the first storage;
   detecting an unrecoverable error occurred in the first storage, wherein the unrecoverable error occurred in a failed disk during a process of rebuilding data for the failed disk;
   replacing the failed disk in the first storage with a spare disk from the first storage where the unrecoverable error occurred while the first storage remains in an online state;
   retrieving data from the second storage based on address information of a data block of the failed disk, wherein the data from the second storage has been verified to be synchronized with the first storage, wherein the data from the second storage is retrieved in units of stripes, wherein the data of the second storage is retrieved by mapping the address information of the data block of the failed disk to a secondary storage address; and
   causing the retrieved data to be written to the spare disk of the first storage.

9. The system of claim 8, wherein retrieving of the data further comprises:
   retrieving the data from the second storage with a background operation in response to a rebuilding bitmap indicating that the data block of the failed disk is to be rebuilt.

10. The system of claim 8, wherein the replacing of the failed disk further comprises:
    monitoring a plurality of factors, wherein the plurality of factors includes a number of storage arrays of the first storage in which unrecoverable errors have occurred, utilization of cache in the first storage, historical I/O workload of the failed disk within a predetermined time period, and a number of I/O request timeouts occurred in the first storage; and
    replacing the failed disk in response to the at least one of the factors being below a corresponding threshold.

11. The system of claim 8, wherein the retrieving the data from the second storage further comprises:
    retrieving the data from the second storage in response to a failure of an I/O request caused by the unrecoverable error.

12. The system of claim 11, wherein the I/O request further comprises;
    requesting to read data from the data block of the failed disk; and
    providing the retrieved data based on the request.

13. The system of claim 11, wherein the I/O request further comprises;
    requesting to write new data into the data block of the failed disk; and
    causing the new data to be written into a data block of the spare disk after the data has been written into a stripe.

14. The system of claim 13, further comprises:
    updating a rebuilding bitmap to indicate that data in the data block of the failed disk has been rebuilt in response to the data having been written to the stripe.

15. A computer program product for maintaining a storage array online when an unrecoverable error has occurred being tangibly stored on a non-transitory machine-readable storage medium and comprising machine-executable instructions, the machine-executable instructions, when executed on a device, causing the device to perform acts including:
    a storage architecture that includes a first storage, a second storage, one or more arrays in the first storage, and multiple disks in each storage array, wherein the second storage stores mirrored data of the first storage;
    detecting an unrecoverable error occurred in the first storage, wherein the unrecoverable error occurred in a failed disk during a process of rebuilding data for the failed disk;
    replacing the failed disk in the first storage with a spare disk from the first storage where the unrecoverable error occurred while the first storage remains in an online state;
    retrieving data from the second storage based on address information of a data block of the failed disk, wherein the data from the second storage has been verified to be synchronized with the first storage, wherein the data from the second storage is retrieved in units of stripes, wherein the data of the second storage is retrieved by mapping the address information of the data block of the failed disk to a secondary storage address; and
    causing the retrieved data to be written to the spare disk of the first storage.

16. The computer program product of claim 15, wherein retrieving of the data further comprises:
    retrieving the data from the second storage with a background operation in response to a rebuilding bitmap indicating that the data block of the failed disk is to be rebuilt.

17. The computer program product of claim 15, wherein the replacing of the failed disk further comprises:
    monitoring a plurality of factors, wherein the plurality of factors includes a number of storage arrays of the first storage in which unrecoverable errors have occurred, utilization of cache in the first storage, historical I/O workload of the failed disk within a predetermined time period, and a number of I/O request timeouts occurred in the first storage; and
    replacing the failed disk in response to the at least one of the factors being below a corresponding threshold.

18. The computer program product of claim 15, wherein the retrieving the data from the second storage further comprises:
    retrieving the data from the second storage in response to a failure of an I/O request caused by the unrecoverable error.

19. The computer program product of claim 18, wherein the I/O request further comprises;

requesting to read data from the data block of the failed disk; and providing the retrieved data based on the request.

20. The computer program product of claim 18, wherein the I/O request further comprises;

requesting to write new data into the data block of the failed disk; and causing the new data to be written into a data block of the spare disk after the data has been written into a stripe.

* * * * *